US008504919B2

(12) United States Patent
Savage

(10) Patent No.: US 8,504,919 B2
(45) Date of Patent: Aug. 6, 2013

(54) PORTABLE CROSS PLATFORM DATABASE ACCESSING METHOD AND SYSTEM

(75) Inventor: Shaun Savage, Aloha, OR (US)

(73) Assignee: Mozapps Limited, Hong Kong (CN)

( * ) Notice: Subject to any disclaimer, the term of this patent is extended or adjusted under 35 U.S.C. 154(b) by 165 days.

(21) Appl. No.: 12/228,593

(22) Filed: Aug. 14, 2008

(65) Prior Publication Data

US 2009/0013173 A1 Jan. 8, 2009

Related U.S. Application Data

(62) Division of application No. 10/271,625, filed on Oct. 16, 2002, now Pat. No. 7,418,665.

(51) Int. Cl.
*G06F 15/00* (2006.01)
*G06F 13/00* (2006.01)

(52) U.S. Cl.
USPC .......................................... 715/734; 715/744

(58) Field of Classification Search
USPC ......... 715/853–855, 740–748, 734, 751–765, 715/728; 709/201, 209
See application file for complete search history.

(56) References Cited

U.S. PATENT DOCUMENTS

| 6,125,363 | A  | * | 9/2000 | Buzzeo et al. ........................ 1/1 |
| 6,591,272 | B1 | * | 7/2003 | Williams .............................. 1/1 |
| 6,604,104 | B1 |   | 8/2003 | Smith |
| 7,020,882 | B1 | * | 3/2006 | Lewallen ....................... 719/328 |
| 7,069,562 | B2 | * | 6/2006 | Kushnirskiy et al. .......... 719/328 |
| 2002/0107999 | A1 |  | 8/2002 | Zimmermann et al. |

OTHER PUBLICATIONS

MozApps (Mozilla Application) Bringing the Power of the NET to You, Today; Jul. 8, 2002;http://www.mozapps.org.

* cited by examiner

*Primary Examiner* — Cao "Kevin" Nguyen
(74) *Attorney, Agent, or Firm* — Fay Sharpe LLP

(57) ABSTRACT

A user manages a database or other application through a remote graphical user interface on a server device through a client device. A cross platform database translation module resides on the client device. The client device may also store cross platform authentication, configuration, and report generating modules for validating a user id and presenting database results in a desirable format. The modules on the client device request applications from a server device, may request validation from an authorization server, may configure embedded devices, and may query a database. The database may reside on a server, on the client device, or on another device.

31 Claims, 16 Drawing Sheets

| LAYER | FUNCTION | LOCATION |
|---|---|---|
| TOP | GRAPHICAL USER INTERFACE APP OTHER APP | PERMANENT ON SERVER TEMPORARILY STORED ON CLIENT |
| MIDDLE | XPCOM BINARY MODULE | NATIVE TO JS INTERFACE ON CLIENT |
| LOW | NATIVE DATABASE DRIVER | ON CLIENT |

| DNS | |
|---|---|
| | FW 0, FW 1, FW 2, . . . FW N |
| FILTER | |
| | FW 0, FW 1, FW 2, . . . FW N |
| PASSWORD | |
| | FW 0, FW 1, FW 2, . . . FW N |
| E-MAIL | |
| | FW 0, FW 1, FW 2, . . . FW N |
| FTP | |
| | FW 0, FW 1, FW 2, . . . FW N |
| WWW | |
| | FW 0, FW 1, FW 2, . . . FW N |

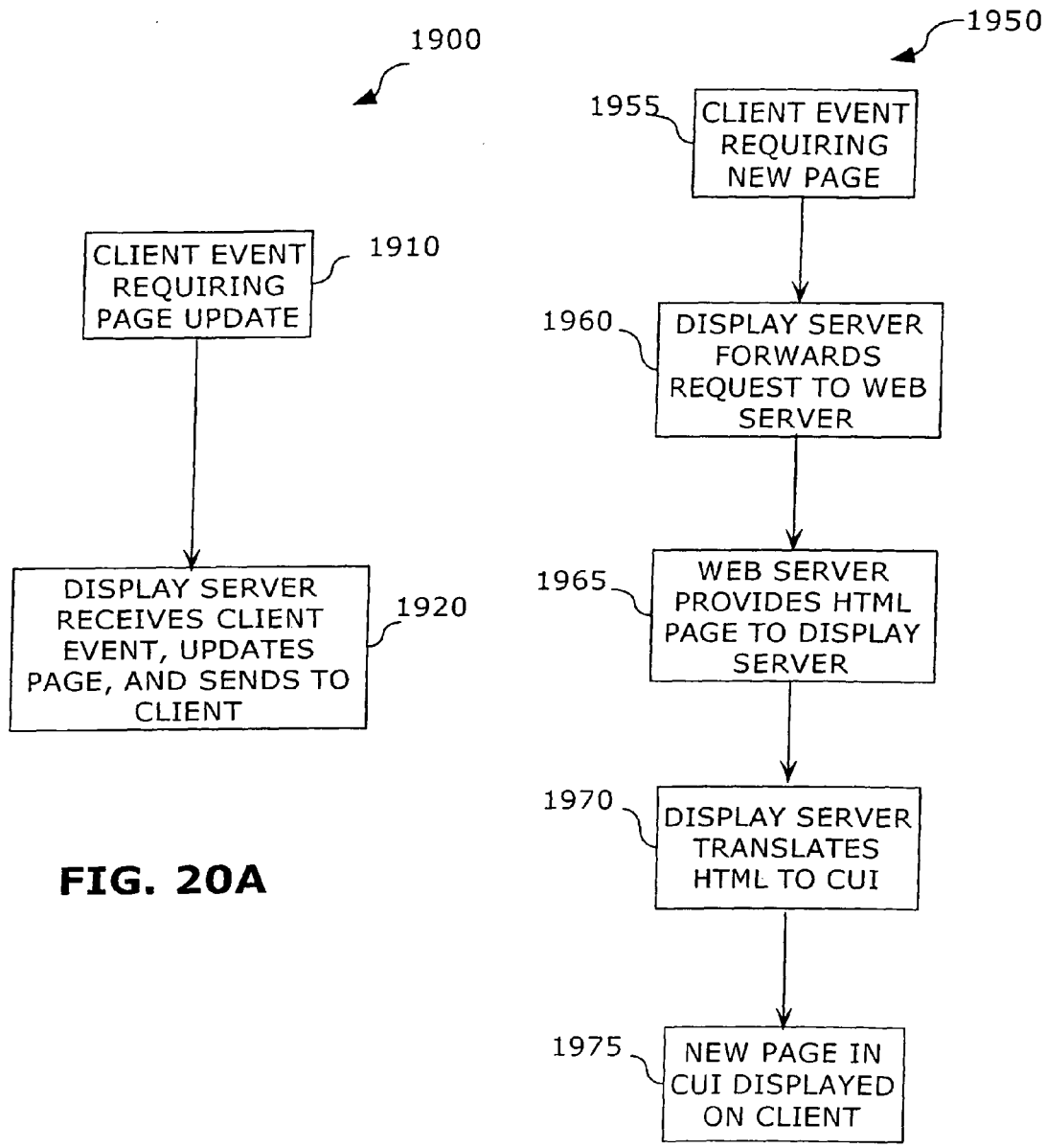

PORTABLE CROSS PLATFORM DATABASE ACCESSING METHOD AND SYSTEM

CROSS REFERENCE TO RELATED APPLICATIONS

The present application is a divisional application of U.S. patent application Ser. No. 10/271,625 filed on Oct. 16, 2002, now U.S. Pat. No. 7,418,665. Said U.S. patent application Ser. No. 10/271,625 is hereby incorporated by reference in its entirety.

FIELD OF THE INVENTION

The present invention generally relates to the field of database management methods and systems, and particularly to a method and system for remote graphical user interface databasing.

BACKGROUND OF THE INVENTION

Database processing has changed over time. Years ago, mainframe based database processing was dominant. The display program was stored on the mainframe and sent to the terminal. Database requests were sent from the terminal that then drew a new screen. Database processing was very slow and cumbersome. In the next generation of database processing, the display program resided on the personal computer (PC) (i.e., client or user device). Database requests were sent to a remote or local database server. The program resident on the PC displayed the results. Database processing speed improved, but continued to be slow. The third generation of database processing involved the repetitive transmittal and receipt of an HTML form between a PC and a web server that accesses the database. Again, database processing speed improved, but was slow. The fourth and current generation of database processing is JAVA/.NET. The java JCODE is down loaded to browser Java Machine. This JCODE code contains the database access code. Problems with JAVA/.NET include large memory requirements for the large code size and unsatisfactorily slow processing.

Aside from the less than desired processing speed and large memory requirements, current network based database systems and methods are subject to various problems such as maintenance costs, security violations, and a lack of adaptability. Maintenance costs for updating all copies of an application when an update becomes available. Storing application programs on the user device poses a security risk through hacking. These applications require a certain amount of user device memory to store application programs permanently or as provided by a server device. The updating is a labor intensive process and costly. Furthermore, network devices, such as printers and routers, are cumbersome to configure.

Therefore, it would be desirable to provide a low maintenance, secure, lightweight, easily configurable, and reusable method and system for accessing a database.

SUMMARY OF THE INVENTION

Accordingly, the present invention is directed to a method and system for remote graphical user interface databasing. The present invention represents the next generation of database processing. The display (or, graphical user interface—GUI) is served from a remote device. The remote device sends widget definitions and descriptions of widget processing to a client device. The descriptions of widget processing describe the actions between the widgets and a binary component object model module resident on the client device. The client device constructs a GUI page from the widget information. The client device queries a database using native database calls from local binary component object model modules. The database that may be resident on the client device, a server device, or another device. The display graphical user interface code is smaller because the display is generated from the predefined widgets.

The present invention provides a reduced maintenance cost because the graphical user interface is on the server. When the application is updated, only the code on the server is updated. This prevents multiple versions of software in a system. When the updated application is loaded onto the client device, the client device has an updated version of the application.

The present invention improves security. Because the application does not reside permanently on the client device, the client device is harder to hack. The code is available only on a need to know basis. Furthermore, an optional security module may be placed on the client device to protect against hacking and all code is digitally signed.

The present invention is lightweight. The native binary modules may only be 30 K to 100 K in size. For example, the data base query language module and the security module may each be 50 K in size. The non-binary GUI temporarily stored on the client device may be 10 K to 50 K. The GUI may be stored in cache memory. Cache memory storage prevents direct memory access. The GUI may be loaded from cache if there have been no changes or may be loaded from the applications server. The small sizes of the native binary modules and the GUI are well suited for embedded applications and remote applications on slow links.

The present invention allows object reuse, permitting many different applications to use the component object model module. These different applications include point of sale, office management systems, and school administration systems.

The present invention allows remote configuration of embedded devices, such as printers and routers. Configuration information may be conveniently displayed for all embedded devices on the network.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 20A and 20B illustrate a method of the present invention employing a character based user interface (CUI).

DETAILED DESCRIPTION OF THE INVENTION

Reference will now be made in detail to the presently preferred embodiments of the invention, examples of which are illustrated in the accompanying drawings.

Figure 1A:
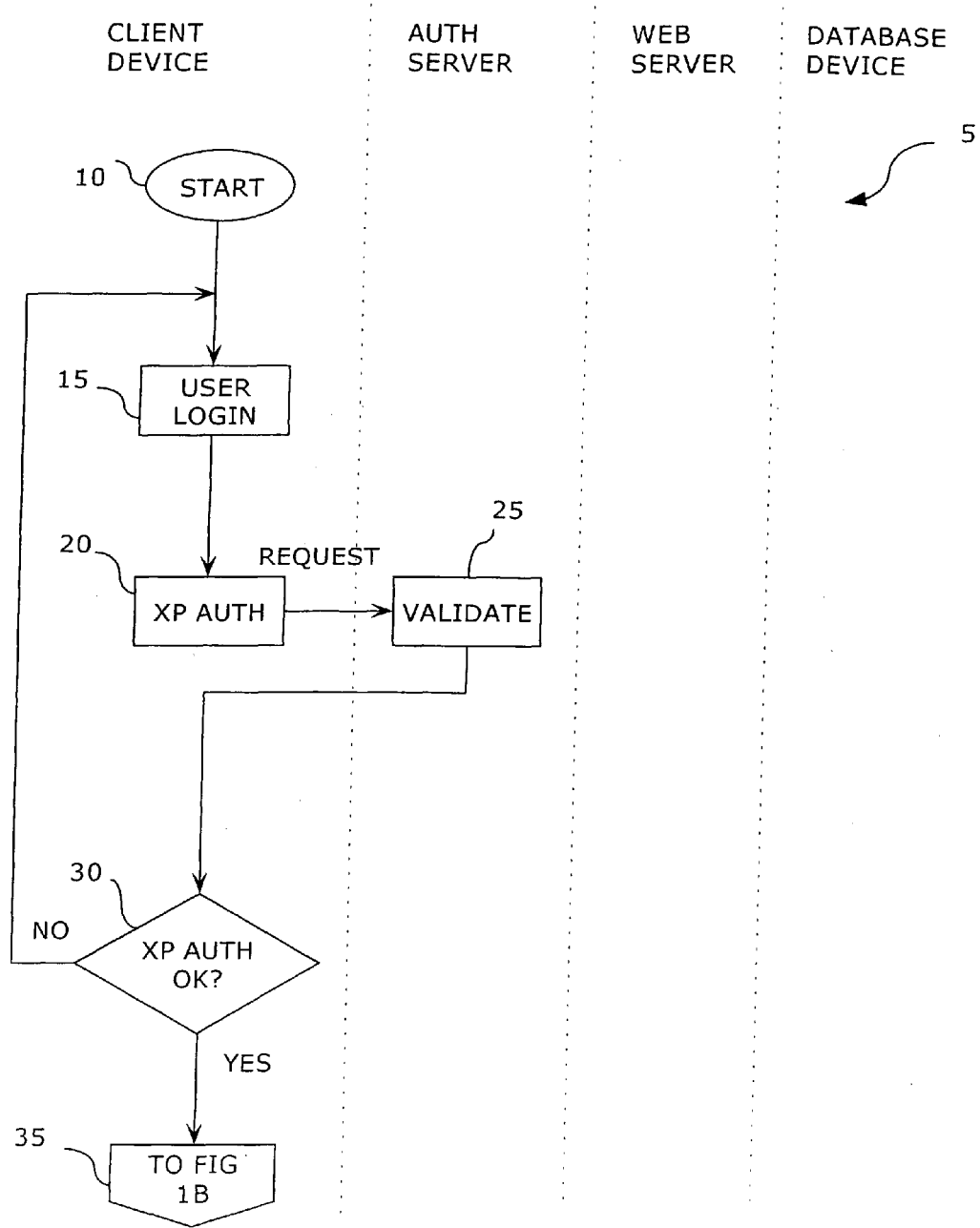
FIGS. 1A and 1B show a preferred embodiment of the method of the present invention.
Figure 1B:
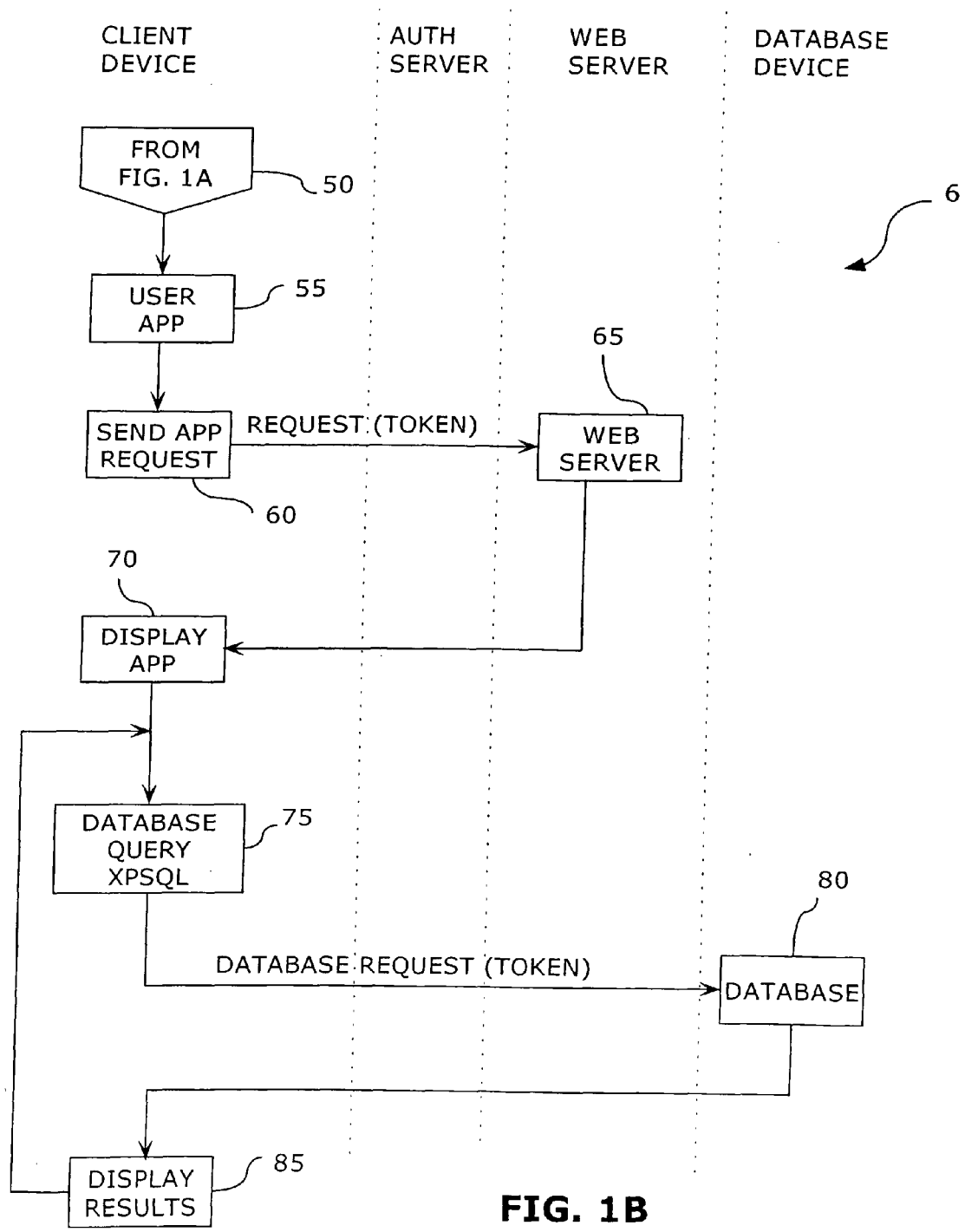

The present invention relates to a remote graphical user interface databasing method and system. Cross platform component object model (XPCOM) modules resident on the client device request user validation, configure embedded devices, create display screens, and interface with a database through communications with external devices. The client device uses widgets and object interface data from a server device to create a display screen operatively coupled to a resident binary component object model module. This binary XPCOM module queries a database, queries an embedded device, validates a user, or generates a report. FIGS. 1A and 1B show a preferred embodiment of a basic process 5, 6 of the present invention in which the client device requests authorization 5 before performing a database operation 6. The term "database" refers to a set of related files that is created and managed by a database management system in which a structured query language (or equivalent) is used to interrogate and process data in the database. Each widget oriented display may be accessed as a URL.

In FIG. 1A, the authorization module 20 on the client device receives a user login information 15 through manual entry of a user id, insertion of a smart card, biometrics, or in a similar manner. The authorization module 20 submits an authorization request for validation 25. An authorization server or another device processes this request and sends back to the client device a validation decision. The decision may be provided as a flag bit, a data word, or a token provided through a secure communication channel. If login authorization is denied 30, processing returns to wait for a new login 15. If the client device receives a token in a valid format (or otherwise determines a valid authorization) 30, the client device stores the authorization information for later use and the user of the client device may then select an application to run 35. User authorization is preferably provided as a token returned to the client device. This token is used to validate the user throughout the network; for example, to access a service.

FIG. 1B shows the process steps for accessing a database application. In the current method, the application program resides on a server and the database translation program resides on the client (or user) device. For a validated authorization 50, a user selects an application to execute. Alternatively, the client device may only run a single application. As the application is not resident on the client device, the client device sends an application request 60 to a web server 65. The application is preferably accessed in the same manner as a web page. The application is preferably written to provide widgets and widget processing and control information. The application may be a document object model. As an example, the widgets may be written in Extensible User Interface Language (XUL) and the widget processing and control information may be described in JavaScript code. The request may include security information, such as a token in which the web server validates the token and sends the application 65 or functional portion thereof or denies access to the client device. The client device then displays the application 70 through a graphical user interface that represents the assembly of the widgets through an object interface (e.g., a JavaScript object interface). The client device queries the relevant database 75. The query may also include security information, such as a token. The query may be in the form of a row and item fetch in which the data is returned as strings. For example, 23 may be returned as ASCII (American Standard Code for Information Interchange) character 2 and ASCII character 3. An array of strings (e.g., "string0", "string1", "string2", etc.) may be returned. For example, for a query including age, firstname, last name, and sex, a string include "23", "lisa", "rothe", and "F" may be returned. The database 80 may reside on a server device, the client device, or another device. The database results are displayed 85 when received. Processing continues until the application database queries end.

Figure 2:
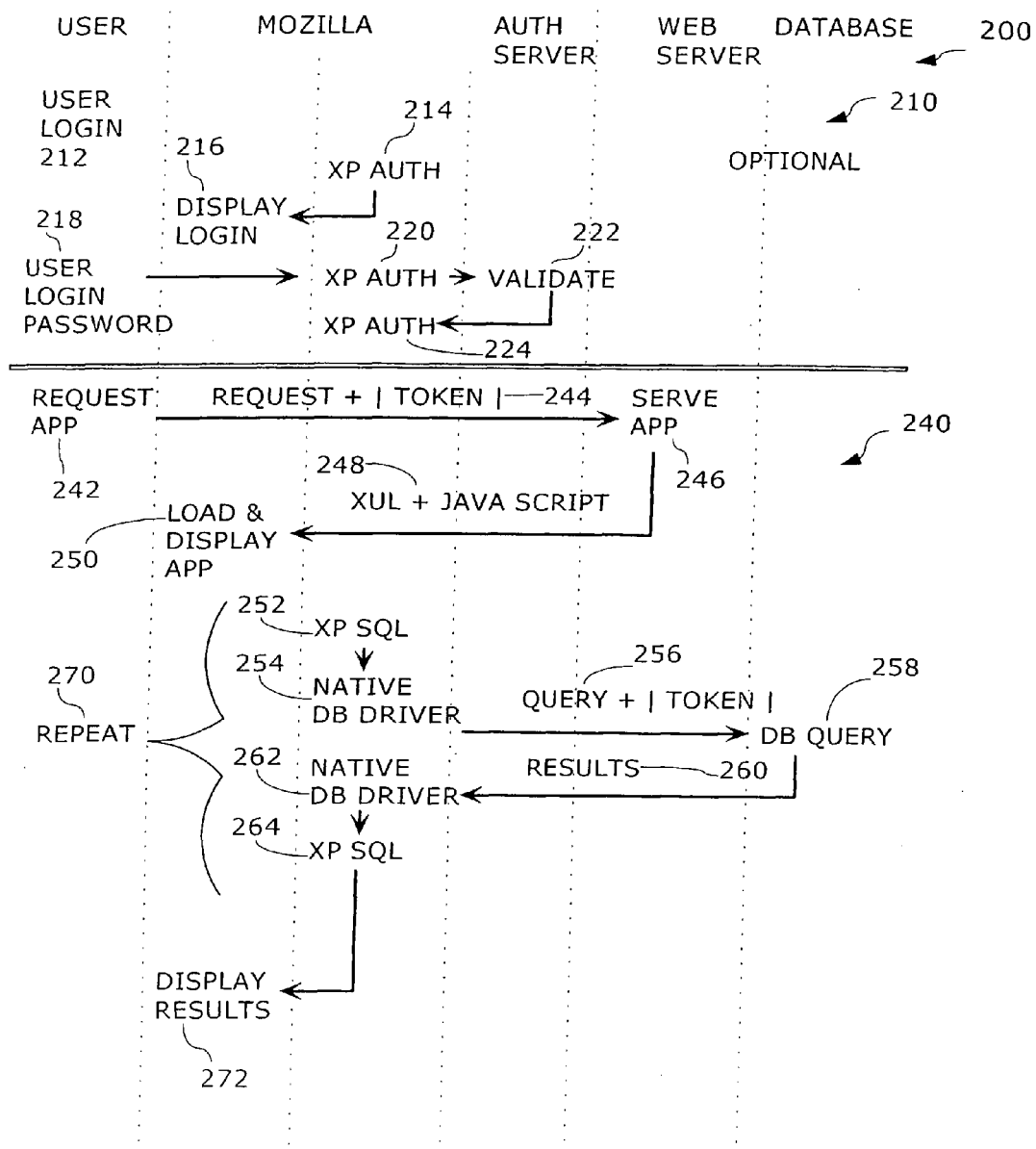
FIG. 2 shows another aspect of the preferred embodiment of FIGS. 1A and 1B for a Mozilla environment.

FIG. 2 shows a more in-depth view of the process 200 of the present invention in which an authorization process 210 precedes the application and database retrieval process 240. When a user logs in 212, the client device's internal security module displays 214 the display login 216. After a validated user types in the password 218 or other user authorization (including fingerprints, biometrics, button keys, smart cards, etc.), the security module 220 queries the authorization program 222 of the server to validate the user. Assuming the password has been entered correctly, the server sends the validation acknowledgment, such as a packet or token, to the security module 224. In the present invention, authorization is an optional process.

Although the present invention is not restricted to a particular browser environment, a specific implementation has been provided for the Mozilla browser. This specific implementation preferably is used with version 1.0 or higher Mozilla or version 6.0 or higher Netscape Navigator. In this specific implementation, XPAUTH, XPSQL XPCOM, XPCONF, and XPREPORT are binary cross platform component object models (XPCOM modules), i.e., dynamically loaded and linked library modules resident on the client device, that each performs specific functions. The XPCOM modules may run on a variety of platforms, such as Windows, VMS, Linux, embedded platform, and the like. As long as the browser runs on the platform, the XPCOM modules may run on the platform.

XPAUTH is an XPCOM module that does user authorization using configurable authentication schemes on a per database security system. Alternatively, XPAUTH may have a main module and modules for handling unique security protocols. XPAUTH may access a Fine Grain Access Control List (ACL) or may provide access to the whole database (or any other service that is provided on the network). The ACL returns a token that is used to validate access to a web server, database, file server, mail server, or any other server or service that needs to have limited access. XPAUTH may use the Kerberos protocol, a network authentication protocol designed to provide strong authentication for client/server applications by using secret-key cryptography. Once authorized, XPAUTH keeps the information and creates headers where needed.

XPSQL contains two parts: the XPCOM module and the JavaScript (JS) database class to allow easy usage for database application developers. The XPSQL XPCOM module is usually written in C++ for faster performance, but may be written in Python for faster development. An important advantage of the XPSQL XPCOM module is that, once installed, any application that uses a database may be written. Although the database application resides on a server and is viewed as a widget display, a user on a client device has the impression of working with the entire application locally. The binary XPSQL XPCOM module is 20K-40K depending upon the database used and the JavaScript file is about 5 k. Alternatively, the XPSQL XPCOM module may include a main module and one or more other modules that each handles a unique native database. Each module specific to a native database may have a different protocol for answering queries over the web. Illustrative examples of native databases include point of sale applications, physician office management, help desks, content management, and the like. As an example of content management, identifying information from a call, such as a caller's phone number, may be presented along with a history of calls from the phone number and information of a descriptive nature about each call.

XPCONF is an embedded device configuration XPCOM module that communicates with a remote applications server and creates a Graphical User Interface for the embedded system configuration on the client device. Embedded devices are those devices that require remote configuration (e.g., routers). Often, embedded devices lack a display; thus, the need for remote configuration. XPCONF may be used for a PC in an enterprise environment that needs to be standardized for the company local network needs a network administrator for configuration. Other examples of environments that may benefit from XPCONF include configurable computerized sheet metal stamping equipment and a configurable automated shipping production line.

The XPREPORT module creates reports, including pie charts and bar graphs, using Scalable Vector Graphics (SVG), a fully scalable vector based graphics extended markup language (XML) format. Because SVG is written in XML, scripting graphics creation is lightweight and powerful.

A specific implementation of the application and database retrieval process 240 is shown in FIG. 2. The user selects an application 242 from the client device. The client device transmits the application request and an optional token to the server 244. The optional token may provide security information. The security information may include authorization information. The server retrieves the requested application 246. The application, preferably be written in XUL and Java Script (JS), is then sent to the client device 248. The application may be one whole crypto signed code or multiple signed codes, i.e., the XUL and JavaScript may be stored in a Java Archive (JAR) file and cryptographically signed using Rivest-Shamir-Adleman cryptographic method (RSA). XUL uses interface widgets (e.g., menu bars or scroll bars) and incorporates standards such as HTML and Cascading Style Sheets (CSS) to provide for powerfully detailed interfaces. JavaScript provides enhanced functionality and features to a XUL interface. The client device loads and displays the application 250. The database query and retrieval process 270 may be iterative. As an example, the cross-platform structured query language (XPSQL) module 252 sends a query to the native database driver 254. The native database driver sends the query and any optional security token to the database 256. The database processes the query 258 and sends results 260 back to the native database driver 262. The native database driver then sends the results to the XPSQL module 264. The process may repeat, as necessary. When the database transaction is completed, the client device displays the database results 272. A diagram of the basic database process is provided below (the XPSQL binary XPCOM module is located on the client device):

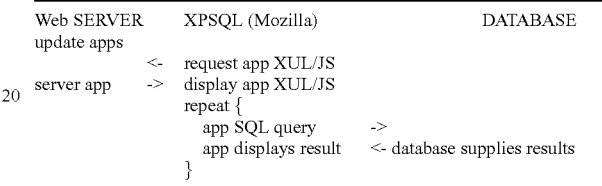

```
Web SERVER       XPSQL (Mozilla)                         DATABASE
update apps
              <- request app XUL/JS
server app    -> display app XUL/JS
                 repeat {
                    app SQL query        ->
                    app displays result  <- database supplies results
                 }
```

Figure 3:
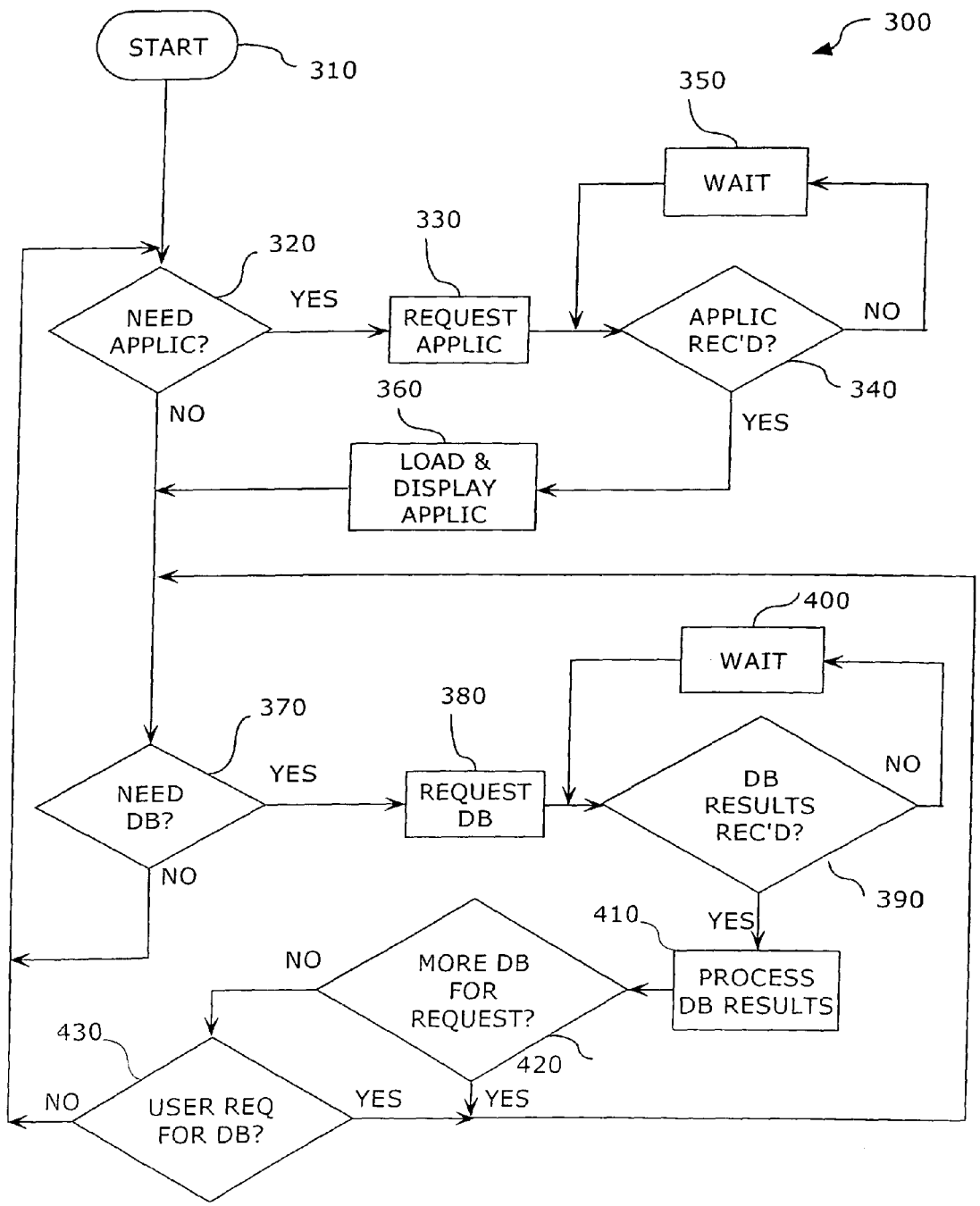
FIG. 3 shows an alternate embodiment of the method of the present invention.

In an alternate embodiment of the method of the present invention, as shown in FIG. 3, the client device requests an application and, when the client device receives the application or operative portion thereof, the client device queries the relevant database. If the client device determines 320 that an application is needed, a request for application 330 is transmitted to the appropriate external device, such as a server. The client device does not attempt to communicate with a database related to the application until the application, or pertinent portion thereof, is received 340. The client device may wait 350 or perform parallel processing during this time. When the client device receives the application, the client device loads and displays the application 360. Then, if the client device determines if a database is to be queried 370, the client device sends a query to the relevant database 380. The database may be resident within the client device, within the applications server, or within another device. The client device determines if the database results have been received 390. If not, the client device waits and/or parallel processes; otherwise, the client device receives and processes the database results 410. Two determinations 420, 430 may then be made: 1) if more data is to be supplied per the latest database request and 2) if not, then has the user made another database request. If both determinations are negative, processing returns to determining whether an application is needed 320. If either determination 420, 430 is affirmative, database processing continues 370.

Security may be enhanced by providing the database with one or more encrypted security indices. A table (or file) usually relates an index to a relational database. In the present invention, each table may be related only through an encrypted index. The index may be encrypted through an encryption algorithm. Keys are used to transform an index to a different index or to transform a key to a different key within a record or row. Keys are common throughout a database and are a constant within a file or table. Indexes are record and field (or, row and item) specific. In the example provided below, the keys pKey and dKey provide a relationship between tables. The pKey and dKey are stored in a table to facilitate access. The phoneKey cannot decode the index without the master key.

```
NowKey = func (masterKey, tableKey)      /*    for each table */
/*    idxP is plain index                                     */
/*    idxC is encrypted index                                 */
idxP = func ( idxC, nowKey )
idxC = func ( idxP, nowKey )
```

Exemplary Table:

| Entry Number idxC | Name | Phone Number (Phone Key) | Phone Master Index idxP | Date (Date Key) | Date Master Index idxP |
|---|---|---|---|---|---|
| 1 | John | 555-1234 | 7865 | 20020915 | 5678 |
| 2 | Bill | 555-9876<br>555-3345 | 9423<br>1076 | 20020910 | 3289 |

Given the following relationships:

$$p\text{Key}=\text{func1}(\text{masterKey},\text{phoneKey})$$

$$idxC=\text{func2}(idxP,p\text{Key})$$

$$d\text{Key}=\text{func1}(\text{masterKey},\text{dateKey})$$

$$idxC=\text{func2}(idxP,d\text{Key})$$

For example, using entry number 1:

$$1=\text{func2}(7865,p\text{Key})$$

$$7865=\text{func2}(1,p\text{Key})$$

$$1=\text{func2}(5678,d\text{Key})$$

$$5678=\text{func2}(1,d\text{Key})$$

Figure 4:
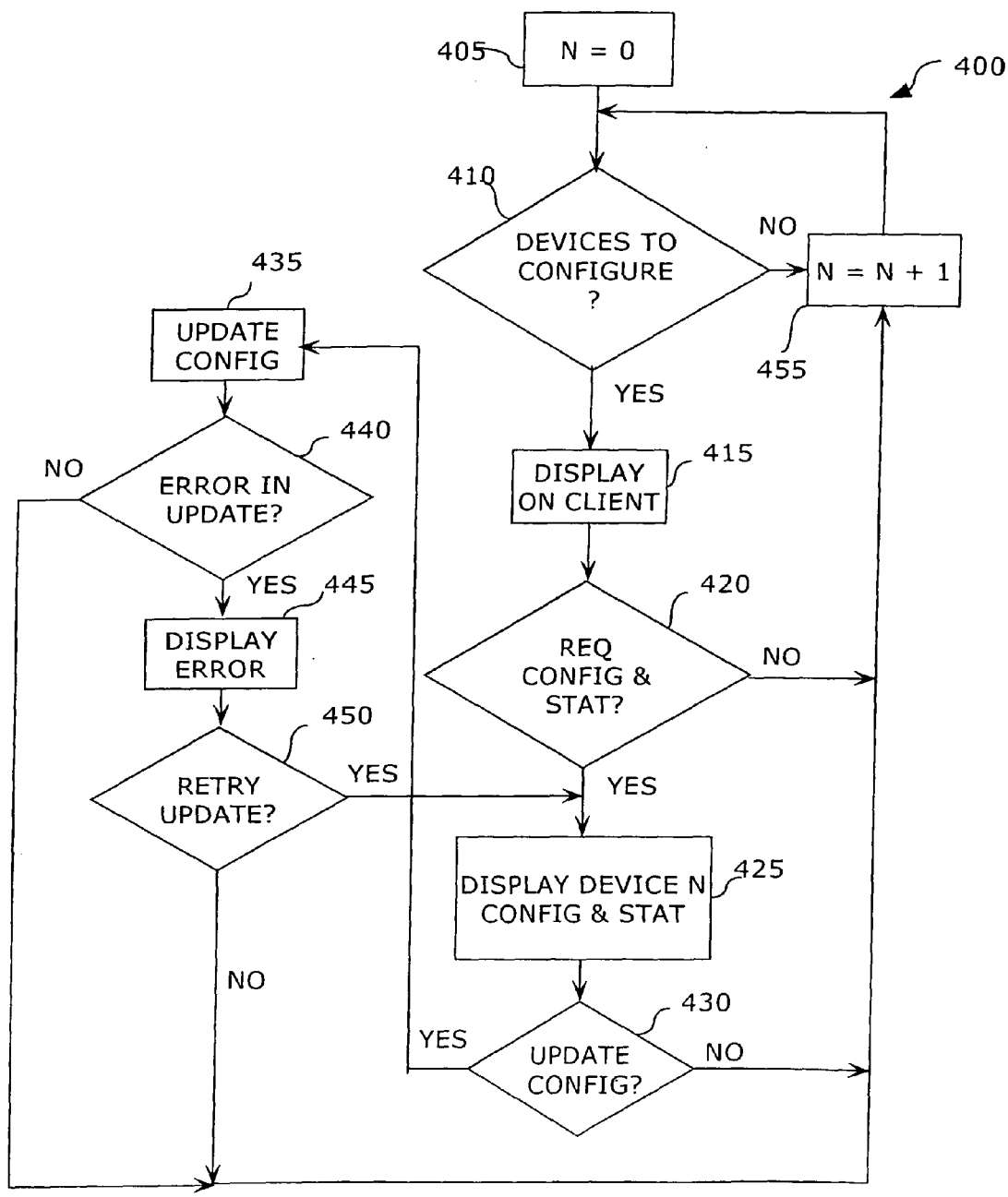
FIG. 4 shows a remote configuration method of the present invention.

FIG. 4 shows an exemplary method for configuring a system using an XPCONF XPCOM module. Configurable devices are successively accessed 405. Any remotely configurable device (e.g., firewalls) may be used with the current method. If it is determined that the first device is remotely configurable, then the device description is displayed on the client device 415. If the user chooses to request the remotely configurable device status and configuration 420, the status and configuration information is displayed 425. The user may then choose to update the configuration 430. If configuration-updating 435 for the device results in an error 440, the error information is displayed 445 and the user may elect to retry the update 450. Otherwise, the next device is accessed 455.

Figure 5:
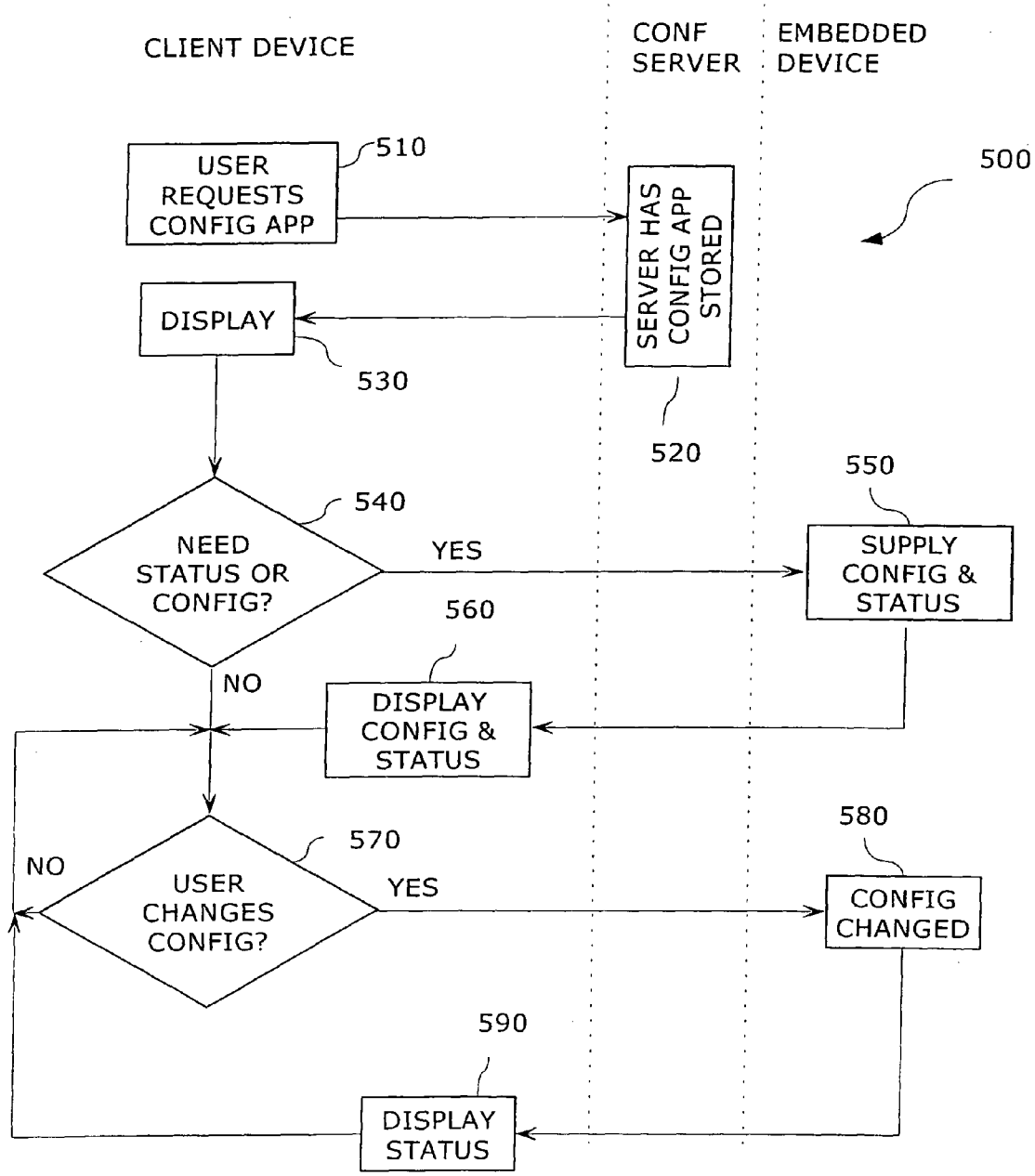
FIG. 5 shows an alternate embodiment of the remote configuration method of FIG. 4.

An alternate embodiment of a remote configuration method is shown in FIG. 5. A user requests a configuration application 510 (e.g., via an XML request). A configurations server provides the requested configuration application 520 to the client device. The client device displays the configuration information 530. If a determination is made that status or configuration information is needed about an embedded device 510, the embedded device is queried. The embedded device supplies the requested configuration and status information 550 that is then displayed 560 on the client device. The user may elect 570 to change the configuration of that embedded device in which case the configuration is changed 580 and the new status or an error message is displayed on the client device 590. The user may then choose to change the configuration of another embedded device 570. The display does not have to be located on the client device, but usually is. As for XPSQL, authorization is an optional process for XPCONF.

Figures 6, 7:
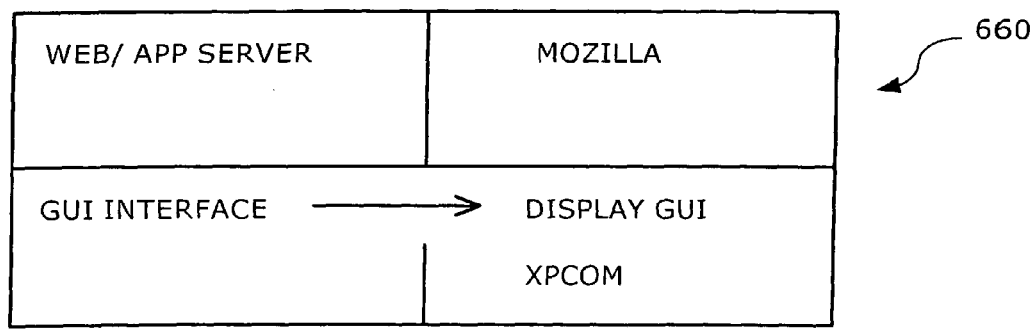
FIG. 6 shows a three-layer protocol model of the communications framework of the present invention on the client device.
FIGS. 7 and 8 show a protocol model for a Mozilla implementation of the present invention.

FIG. 6 shows a three-layer protocol model 650 describing the functional elements of the present invention. The top layer may be an application program, such as a graphical user interface, written in one or more of XUL, Java Script (JS), Resource Description Format (RDF), Cascading Style Sheets (CSS), and/or other suitable language. In XUL the display can be created on the client. The top layer is completely developer dependent, except for the JS database class. The applications are permanently stored on the applications or web server and cached on the client device. The middle layer includes the binary XPCOM module and the XPCONF module residing on the client device. The XPCOM module provides a native to Java Script interface. The low layer is the native database driver. Native database drivers reside on the client device. The client device may have several native database drivers that interface with a resident XPCOM module. Because the native database drivers are available on multiple platforms, the database is cross platform.

Figure 8:
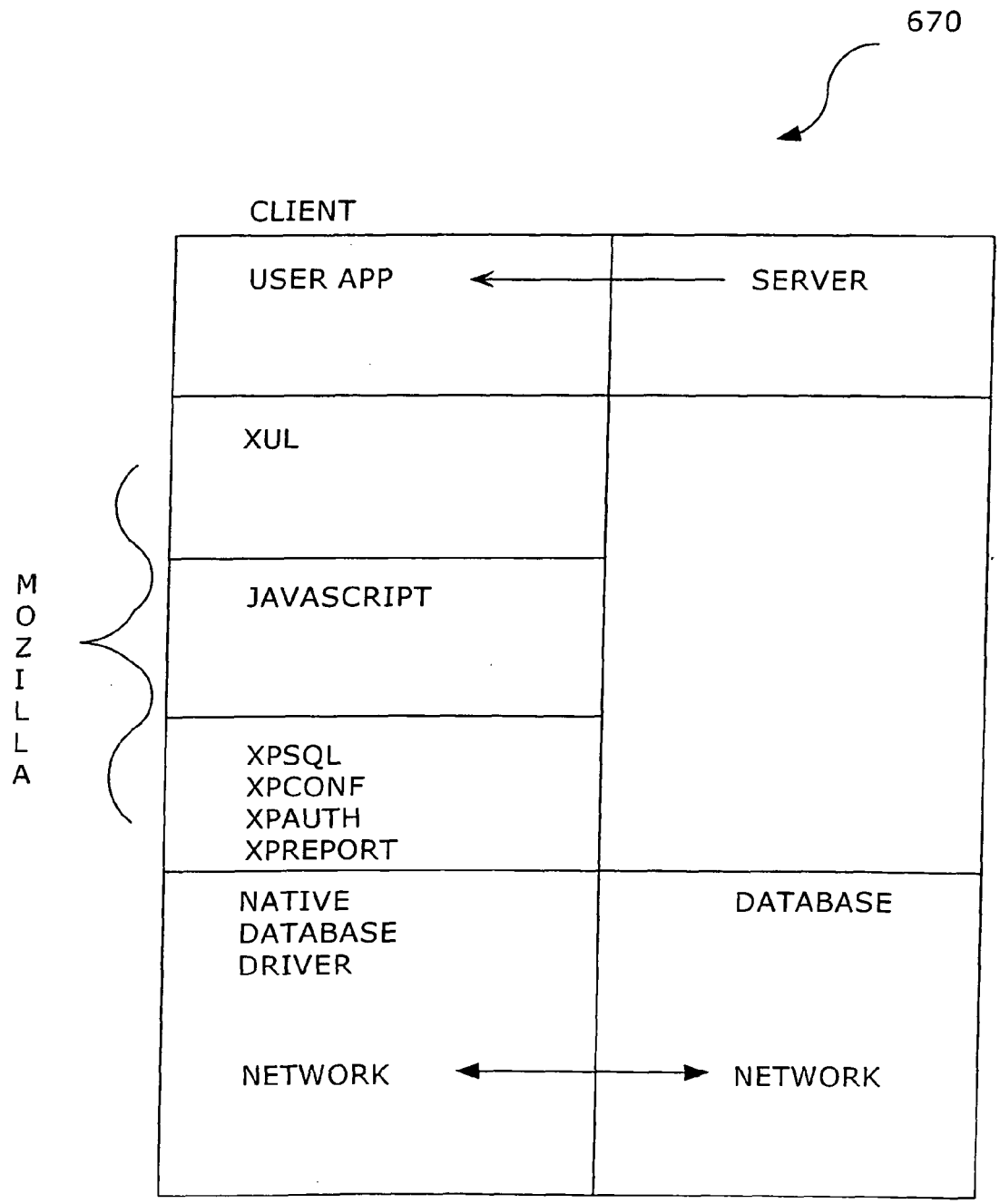

A protocol model for a Mozilla application is shown in FIGS. 7 and 8. FIG. 7 shows a basic block diagram 660 of the functionality of the web based applications server and the Mozilla browser. The server provides the GUI interface. Mozilla displays the GUI and controls the XPCOM modules, such as XPSQL, XPAUTH, XPCONF, and XPREPORT. FIG. 8 shows another view of the relationship 670 of the server, the client device, Mozilla, and the database. The functionality of the Mozilla browser is divided between the server device and the client device. The server device includes the applications program written for Mozilla. The client device has a native database driver. The only connection the database may have with the client device is through a connection over the network. The database may reside on the server device, the client device, or elsewhere.

Figure 9:
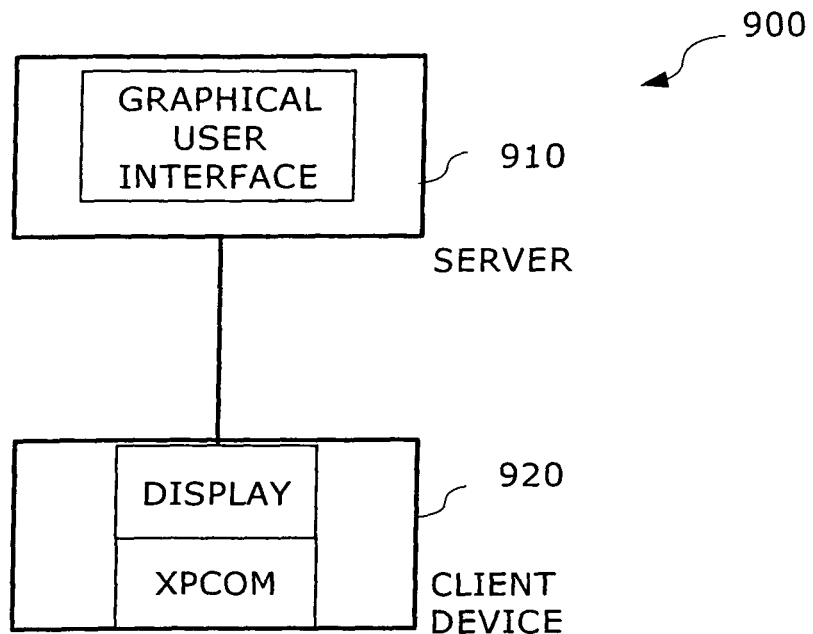
FIG. 9 shows a basic functional model of the present invention.
Figure 10:
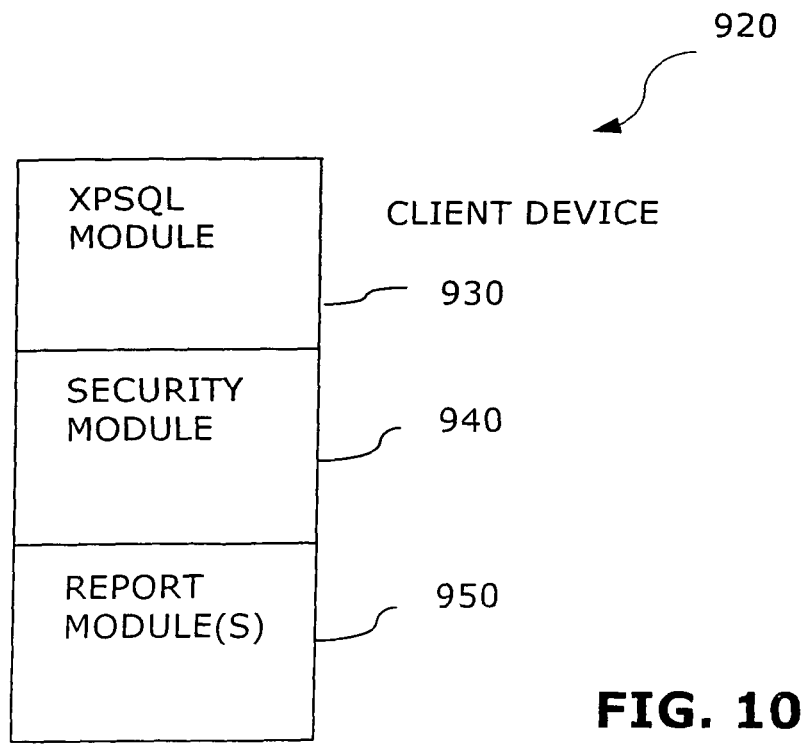
FIG. 10 shows an embodiment of a functional model of a client device of the present invention.

FIGS. 9 and 10 illustrate exemplary embodiments of basic elements of the present invention. FIG. 9 shows the simplest system 900 in which a server 910 communicates with a client device 920. The server 910 provides a graphical user interface and the client device stores an XPCOM module and has a display screen. FIG. 10 shows the client device 920 having an XPSQL module 930, a security module 940, and a report module 950. The binary code for the modules may be stored on the client device 920 in flash memory, non-volatile random access memory, or other suitable storage device.

Figure 11:
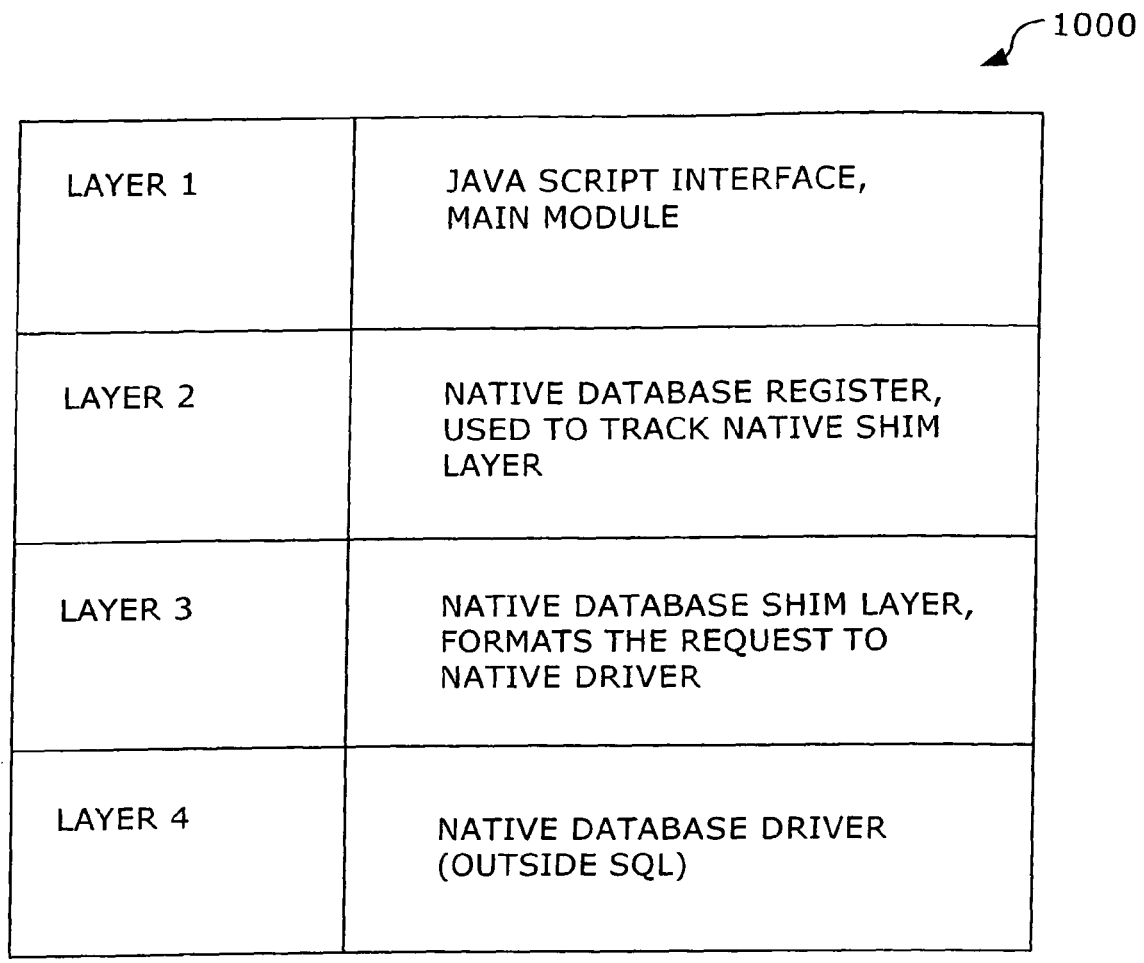
FIG. 11 shows a layer model of the XPSQL module.

FIG. 11 shows a representation of the functions of the XPSQL XPCOM module as layers. Layer 1 represents the Java Script interface for communicating with the main module. Layer 2 represents the native database register for keeping track of the native shim layer. Layer 3 represents the native shim layer. Layer 3 formats the request to the native database driver. Layer 4 is the native database driver. Layer 4 uses native data and does not use SQL. Data is passed as arguments from the binary code to Java Script code as integers using the Interface Definition Language (IDL) data specification. Because many databases may be open and many database search results may be received simultaneously (parallel processing), the integer may be used to identify the database or search result. For example, C++ binary would transfer information to the Java Script interface from a database structure as an integer and the Java Script interface would transfer data and commands to the C++ binary code from integer to a database object.

Figure 12:
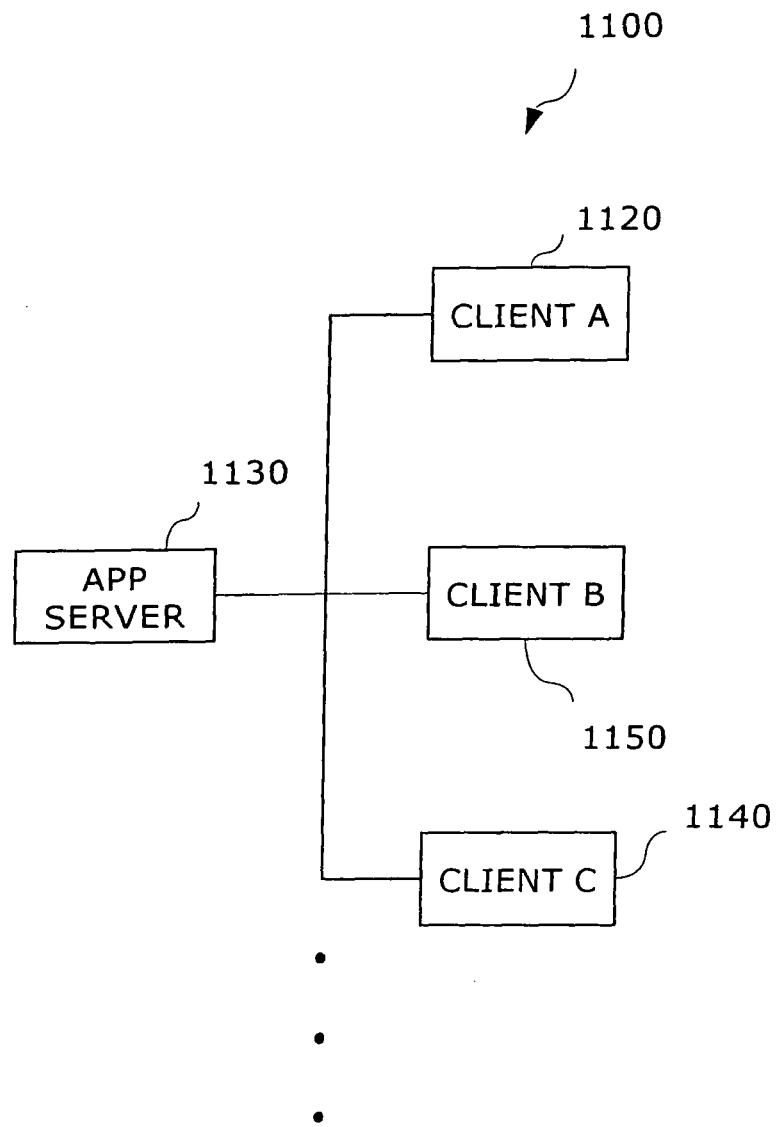
FIG. 12 shows an exemplary system of the present invention.
Figure 13:
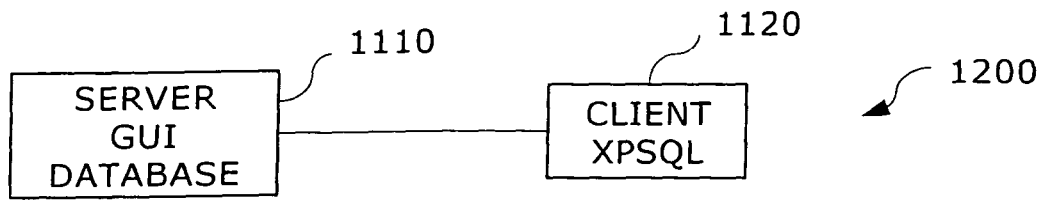
FIG. 13 shows a first embodiment of a functional block diagram of a system of the present invention.
Figure 14:
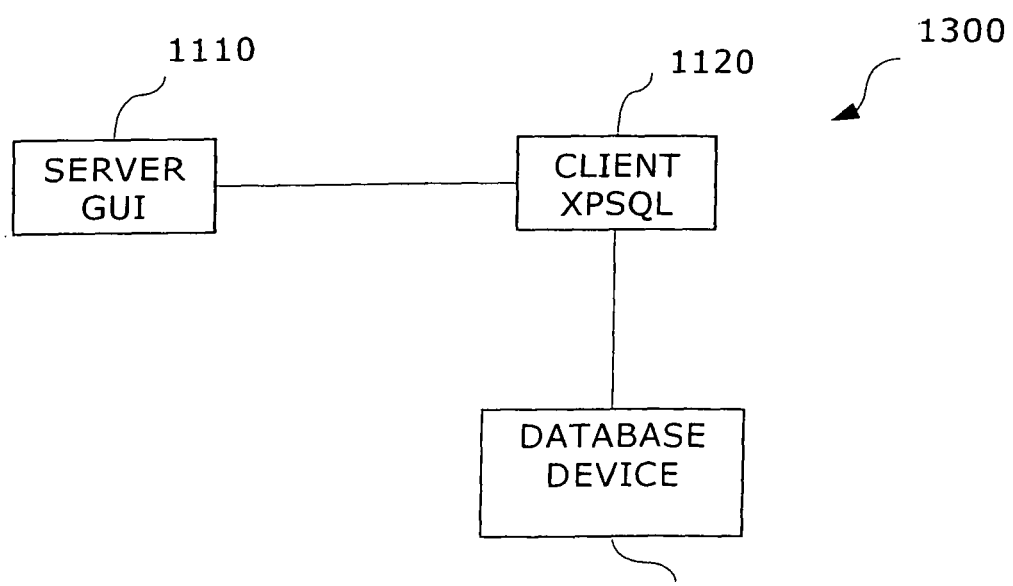
FIG. 14 shows a second embodiment of a functional block diagram of a system of the present invention.

The present invention is directed to a system 1100, as shown in FIG. 12, having multiple client devices 1120, 1130, 1140 connected to an applications server device 1110 through a bus. In the present invention, the graphical user interface resides on the server device 1110 and the XPSQL XPCOM module resides on a respective client device 1120. FIGS. 13 and 14 illustrate two alternative embodiments 1200, 1300 in which the database resides on different devices. In FIG. 13, the database resides on the server device 1110. In FIG. 14, the database resides on a third device 1130. The database may also reside on the client device.

Figure 15:
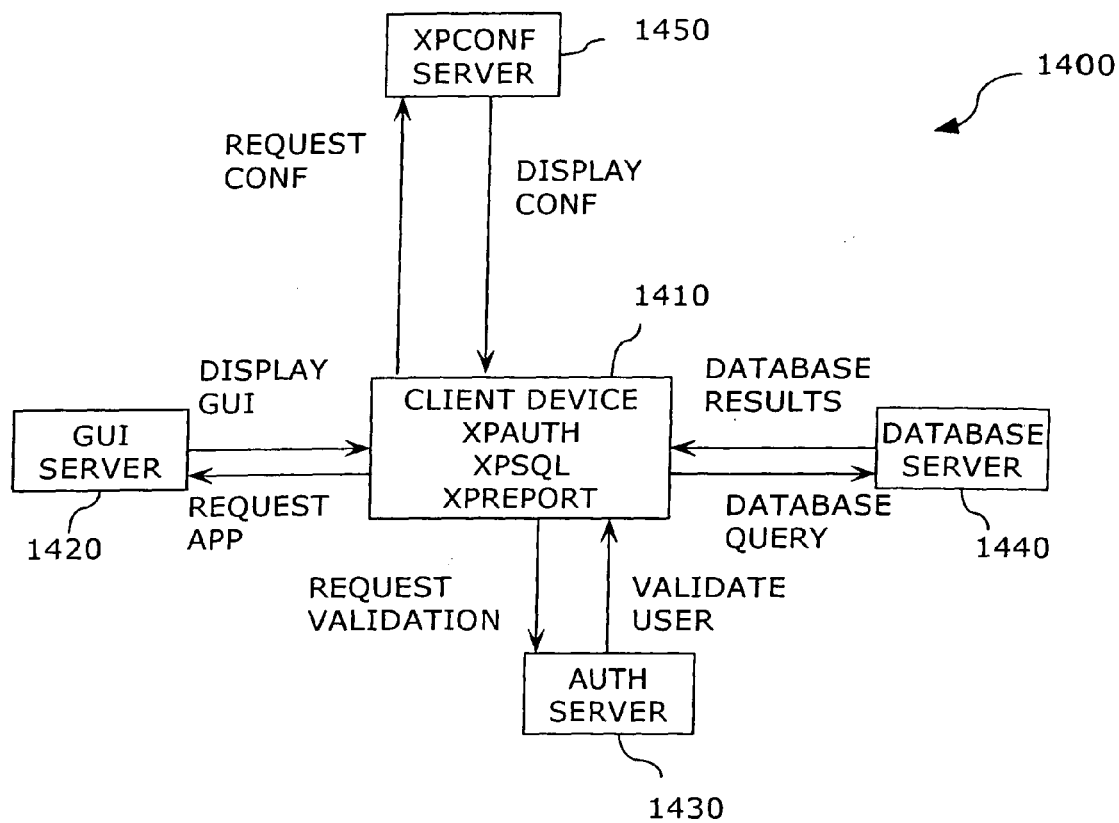
FIG. 15 shows an exemplary embodiment for a Mozilla based system using the method of the present invention.

FIG. 15 shows a system 1400 in which the client device 1410 contains a cross platform authorization module XPAUTH, a cross platform SQL module XPSQL, a cross platform configuration module XPCONF, and a cross platform report module XPREPORT. The GUI server 1420 provides access to the GUI program to the client device 1410. The client device creates a page from the widget definitions and relationships provided by the GUI program resident on the GUI server 1420. The client device may configure one or more embedded devices, such as routers, through the XPCONF server 1450. The client device 1410 queries a server 1430 that validates the user login id. Then, the client device 1410 requests an application from a GUI server 1420. When the client device 1410 receives the application from the GUI server 1420, the client device 1410 then queries the database server 1440. The division of processing through various server devices is meant as an example. Other variations are contemplated by the present invention such that the multiple XPCOM modules may be resident on a single device.

Figure 16:
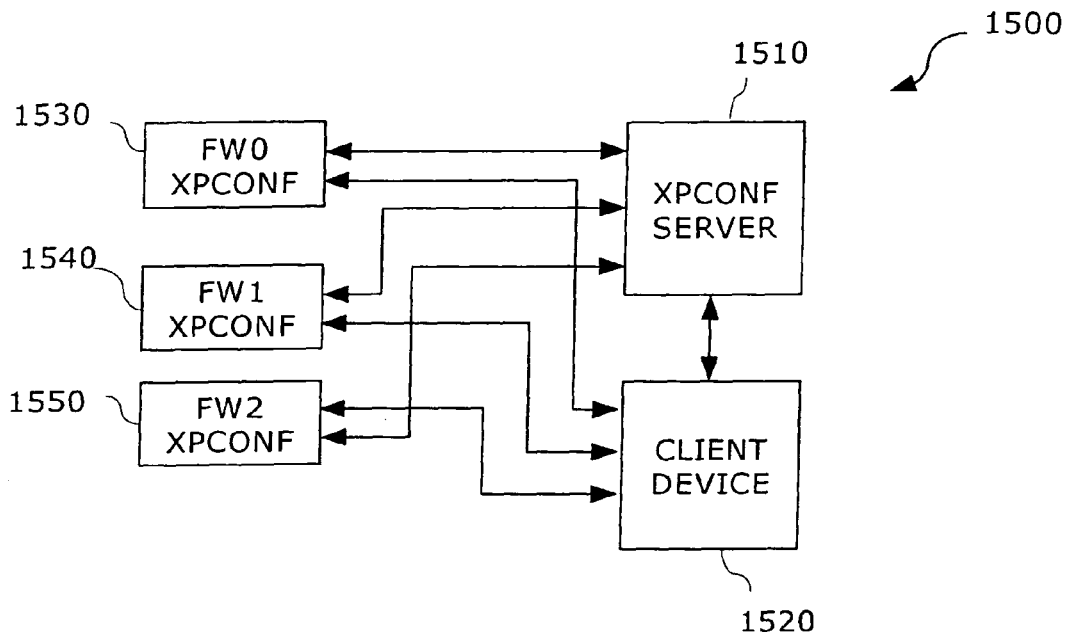
FIGS. 16 and 17 show exemplary embodiments of a remote configuration system for embedded devices, according to the present invention.
Figure 17:
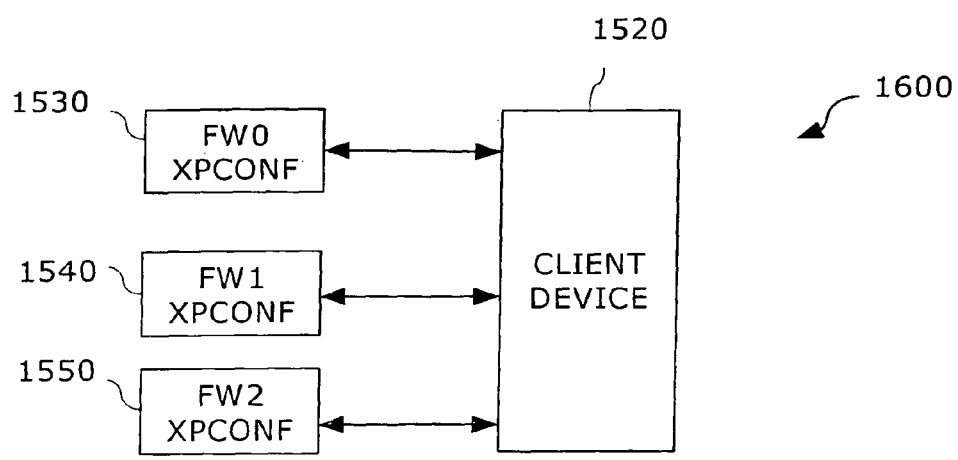

FIGS. 16 and 17 show two embodiments 1500, 1600 of the present invention regarding remote configuration through the client device. Invocation of XPCONF results in the display of a widgets based graphical user interface. In FIG. 16, an XPCONF register (or server) 1510 controls access to embedded devices (or targets) 1530, 1540, and 1550 by the client device 1520. In FIG. 17, the client device 1520 directly accesses the embedded devices 1530, 1540, and 1550 for remote configuration. As XPCONF is scalable, a variety of arrangements of embedded devices may be presented to the client device for configuration.

Figures 18, 19:
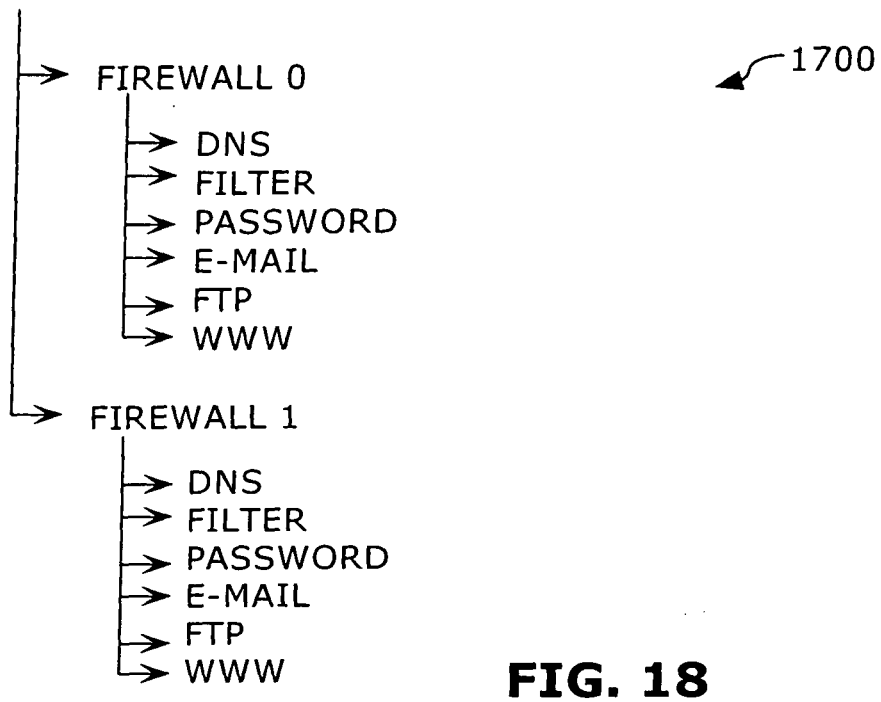
FIGS. 18 and 19 show exemplary formats of configuration information for a system, according to the present invention.

FIGS. 18 and 19 show exemplary formats of remote configuration data. Configuration information may be displayed in real time. Displaying the configuration information for the entire system reduces maintenance costs. Each XPCONF configurable embedded device, such as a router or printer, should be registered by a central XPCONF configurations registry device or otherwise be uniquely identifiable (e.g., by domain name). Other configuration information may include filtering to determine which packets are permitted to pass through the firewall and administration logins and passwords for security. When needed or desired, the total configuration may be displayed through a GUI. FIG. 18 shows a tree structure of the embedded devices. FIG. 19 presents a configuration panel of the embedded devices. A mixture of a tree structure and a configuration panel may be employed. The formatting schemes may be made to resemble preference menus. Each configuration may be accessible as a URL.

For character based legacy devices, a character based user interface (CUI) of the present invention may be used to convert an HTML page to a widget oriented display. In the CUI, every keystroke on the legacy device (e.g., character terminal) is sent to a display server. The display server determines the difference between the old page and the new page and generates a new display based on the difference based on the keystrokes received. Advantages of the CUI include a very low bandwidth since each change may average less than 20 characters uncompressed and a high display refresh rate since the whole screen may be less than 1 K uncompressed.

FIGS. 20A and 20B illustrate a method of the present invention employing a CUI. In FIG. 20A, for a page-updating event 1910, keystrokes from the client device are interpreted by the display server that updates the page. The page is then displayed on the client 1920. In FIG. 20B, a new page event 1955 from the client is recognized and forwarded by the display server to a web server 1960. The web server, in response, provides an HTML page to the display server 1965. The display server translates the HTML page to CUI 1970. The new page is then displayed on the client device 1975.

The present invention is useable for a variety of database management systems in a variety of environments. The database management systems include point of sale applications, library circulation files, doctors' accounts, school administration systems, employee rolls, and the like. In a specific implementation, the method of the present invention may be incorporated into any device that Mozilla version 1.0 or higher or Netscape version 6.0 or higher runs on. The present invention may be used in a personal computer attached to a network via cable or through wireless communications or may be implemented in a handheld device. For example, the present invention may be implemented on a 16M FLASH wireless PDA, a Linux PC, a Windows PC, or an IBM S390. Processing speed may be determined by the display speed of XUL. For mobile devices, XML code may be converted to an American National Standards Institute (ANSI) character set. Every widget has a TAG. For every TAG, there is a binary number. The binary number may describe the application instead of XML so XUL becomes binary XUL (bXUL). A binary representation of XML is shown in the table below.

| TAG | BINARY |
| --- | --- |
| window | 0 |
| button | 1 |
| box | 2 |
| hbox | 3 |
| vbox | 4 |

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A non-transitory computer-readable medium device that stores an executable program for accessing a database through a graphical user interface, comprising:
  a first component object model module for validating a user, the first component object model module including sub modules, each of the sub modules handling a unique security protocol;
  a second component object model module for handling an application from and loading an application from an external device and querying and processing results from querying a database; and
  application and widget information for constructing a graphical user interface (GUI), wherein the widget information comprises widgets, widget definitions, and widget processing code, the widget processing code describing actions between the widget and a binary component object model resident on the client device; and
  wherein the first and second component object model modules reside on a client device.

2. The non-transitory computer-readable medium of claim 1, wherein the external device is an applications server.

3. The non-transitory computer-readable medium of claim 1, wherein the database is external or internal to the client device.

4. The non-transitory computer-readable medium of claim 3, wherein the component object module is binary and is cross platform.

5. The non-transitory computer-readable medium of claim 4, wherein the first component object model module communicates with an authentication server.

6. The non-transitory computer-readable medium of claim 5, wherein the client device constructs an application from widgets supplied by the applications server.

7. The non-transitory computer-readable medium of claim 6, further comprising a third component object model module for accessing a native database.

8. The non-transitory computer-readable medium of claim 6, the second component object model module including one or more sub modules for accessing native databases.

9. The non-transitory computer-readable medium of claim 6, further comprising a third component object model module for handling a security protocol.

10. The non-transitory computer-readable medium of claim 6, further comprising a fourth component object model module for viewing configuration and status information of an embedded device or remote device.

11. A method of remote graphical user interface processing of data, comprising the steps of:
a client device requesting an application from an external device;
the client device receiving the application and widget information from the external device to construct a graphical user interface (GUI), wherein the widget information comprises widgets, widget definitions, and widget processing code, the widget processing code describing actions between the widget and a binary component object model resident on the client device;
the client device using the widgets and the widget processing code to assemble a GUI;
the client device communicating with the external device using the application through the constructed GUI; and
displaying the application on the client device through a GUI using newly received widget information.

12. The method of claim 11, further comprising the step of processing data using a Javascript database class and the component object model module, wherein the displaying of the application is through a GUI that represents an assembly of widgets through a Javascript database class interface.

13. The method of claim 12, wherein the component object model module is a cross platform component object model module.

14. The method of claim 13, wherein the step of communicating with the external device includes the steps of querying a database, receiving database results, and processing the database results.

15. The method of claim 14, wherein the step of querying a database is accomplished through a structured query language.

16. The method of claim 14, wherein the database is a relational database that is secured through an encrypted index.

17. The method of claim 14, wherein the database is a relational database and each entry of the database has at least one encrypted index.

18. The method of claim 17, wherein the at least one encrypted index is stored in a table.

19. The method of claim 11, wherein the widget processing code received to assemble a GUI is extensible mark up language (XML) code.

20. A method for configuring embedded devices on a network using the method of claim 11, further comprising the steps of: requesting a configurations application by a client device; displaying the configurations application on the client device based on widget information; requesting status and/or configuration information from an embedded device through the configurations application; displaying the status and/or configuration information from the embedding device on the client device; and updating the configuration information on the embedded device through the client device.

21. The method of claim 20, further comprising the step of displaying the updated configuration of the embedded device.

22. The method of claim 21, wherein requesting, displaying, and updating of the configuration information for the embedded device is performed through a component object model module on the client device.

23. A method for securing a relational database using the method of claim 11, further comprising the steps of: accessing a record from a relational database; generating an unencrypted index for a first field of the record; storing the unencrypted index in a table; generating an encrypted index through an encryption algorithm for a second field of the record; storing the encrypted index in the table; and using a master key and one of the group consisting of the encrypted index and the unencrypted index to obtain the other of the group consisting of the encrypted index and the unencrypted index.

24. The method of claim 23, wherein the secured relational database is accessed by a remote GUI databasing method.

25. The method of claim 24, wherein the remote GUI databasing method uses a widget based GUI for databasing from a client device.

26. The method of claim 25, wherein databasing functions are performed through one or more cross platform component object model modules resident on the client device.

27. A method for providing a character based user interface to a character based, legacy device using the method of claim 11, further comprising the steps of: entering a keystroke on a client device; transmitting the keystroke to a display server; and equating the keystroke with a page update event or a new page event.

28. The method of claim 27, further comprising, for a page update event, updating the page on the display server and transmitting the page to the client device.

29. The method of claim 28, further comprising, for a new page event, forwarding the new page event information from the display server to a web server.

30. The method of claim 29, further comprising, for a new page event, generating an HTML page on the web server and transmitting the HTML page to the display server.

31. The method of claim 30, further comprising, for a new page event, translating the HTML page to a character based page and sending the character based page to the client device for display.

* * * * *